(12) United States Patent
Nishi et al.

(10) Patent No.: US 11,803,109 B2
(45) Date of Patent: Oct. 31, 2023

(54) PROJECTION METHOD, PROJECTION DEVICE, AND PROJECTION SYSTEM

(71) Applicant: Panasonic Intellectual Property Management Co., Ltd., Osaka (JP)

(72) Inventors: Tetsuya Nishi, Osaka (JP); Yuki Hayashi, Osaka (JP); Keisuke Hara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/637,675

(22) PCT Filed: Aug. 4, 2020

(86) PCT No.: PCT/JP2020/029850
§ 371 (c)(1),
(2) Date: Feb. 23, 2022

(87) PCT Pub. No.: WO2021/039313
PCT Pub. Date: Mar. 4, 2021

(65) Prior Publication Data
US 2022/0276548 A1    Sep. 1, 2022

(30) Foreign Application Priority Data

Aug. 28, 2019  (JP) ................................ 2019-156176

(51) Int. Cl.
G03B 21/14 (2006.01)
G03B 21/26 (2006.01)
B25H 7/04 (2006.01)

(52) U.S. Cl.
CPC .......... *G03B 21/142* (2013.01); *B25H 7/045* (2013.01); *G03B 21/147* (2013.01); *G03B 21/26* (2013.01)

(58) Field of Classification Search
None
See application file for complete search history.

(56) References Cited

U.S. PATENT DOCUMENTS

2015/0350617 A1* 12/2015 Chevassus ........... H04N 9/3191
348/745
2016/0057400 A1   2/2016 Winter et al.

FOREIGN PATENT DOCUMENTS

JP    2008-224516 A     9/2008
JP    2008224516 A  *   9/2008
JP    6244008 B2       12/2017

OTHER PUBLICATIONS

International Search Report issued in International Patent Application No. PCT/JP2020/029850, dated Oct. 20, 2020; with English translation.

* cited by examiner

*Primary Examiner* — Bao-Luan Q Le
*Assistant Examiner* — Danell L Owens
(74) *Attorney, Agent, or Firm* — McDermott Will & Emery LLP (57) ABSTRACT

A projection method, which is executed by a projection device, for projecting drawing data for a building onto a projection plane of the building under construction includes: measuring a distance from each of three or more points which are not aligned in a straight line and are on either of two non-parallel straight lines on the projection plane to the projection device using a distance meter included in the projection device; and projecting the drawing data onto a projection position on the projection plane which is determined based on the distance measured and the angle of the distance meter at the time at which the distance is measured.

15 Claims, 9 Drawing Sheets

PROJECTION METHOD, PROJECTION DEVICE, AND PROJECTION SYSTEM

CROSS-REFERENCE OF RELATED APPLICATIONS

This application is the U.S. National Phase under 35 U.S.C. § 371 of International Patent Application No. PCT/JP2020/029850, filed on Aug. 4, 2020, which in turn claims the benefit of Japanese Application No. 2019-156176, filed on Aug. 28, 2019, the entire disclosures of which Applications are incorporated by reference herein.

TECHNICAL FIELD

The present invention relates to a projection method, a projection device, and a projection system.

BACKGROUND ART

Conventionally, projection devices that can project an image onto, for example, a screen have been known. As a technique relating to projection devices, Patent Literature (PTL) 1 discloses a method for displaying an object included in a design plan and object data on the design plan on a boundary wall surface of a room.

CITATION LIST

Patent Literature

[PTL 1] Japanese patent No. 6244008

SUMMARY OF INVENTION

Technical Problem

In the method disclosed by PTL 1, an association between a reference device and a design plan is formed using a known reference object. Accordingly, a plurality of reference objects need to be placed in conspicuous positions inside a space in advance.

The present invention provides a projection method, a projection device, and a projection system which can readily form an association between a position in drawing data and a position in a projection plane onto which the drawing data is projected.

Solution to Problem

A projection method according to an aspect of the present invention is a projection method, which is executed by a projection device, for projecting drawing data for a building onto a projection plane of the building under construction, the projection method includes: measuring a distance from each of three or more points on either of two straight lines on the projection plane to the projection device using a distance meter included in the projection device, the two straight lines being non-parallel lines, the three or more points being not aligned in a straight line; measuring an angle of the distance meter at a time at which the distance is measured; and projecting the drawing data onto a projection position on the projection plane, the projection position being determined based on the distance measured and the angle of the distance meter at the time at which the distance is measured.

A projection device according to an aspect of the present invention is a projection device that includes: a projector that projects drawing data for a building onto a projection plane of the building under construction; a distance meter that measures a distance from each of three or more points on either of two straight lines on the projection plane to the projection device, the two straight lines being non-parallel lines, the three or more points being not aligned in a straight line; an angle measurer that measures an angle of the distance meter at a time at which the distance is measured; and a controller that causes the projector to project the drawing data onto a projection position on the projection plane, the projection position being determined based on the distance measured and the angle of the distance meter at the time at which the distance is measured.

A projection system according to an aspect of the present invention includes: the projection device; and an operation device for a user to remotely control the projection device.

Advantageous Effects of Invention

A projection method, a projection device, and a projection system according to the present invention can readily form an association between a position in drawing data and a position in a projection plane onto which the drawing data is projected.

DESCRIPTION OF EMBODIMENTS

Hereinafter, embodiments will be described in detail with reference to the drawings. Note that the embodiments below each describe a general or specific example. The numerical values, shapes, materials, elements, the arrangement and connection of the elements, steps, and orders of the steps, etc. presented in the embodiments below are mere examples, and are not intended to limit the present invention. Furthermore, among the elements in the embodiments below, those not recited in any one of the independent claims will be described as optional elements.

Note that the drawings are schematic diagrams, and do not necessarily provide strictly accurate illustration. Throughout the drawings, the same numeral is given to substantially the same element, and redundant description may be omitted or simplified.

Embodiment

[Overview]

Figure 1:
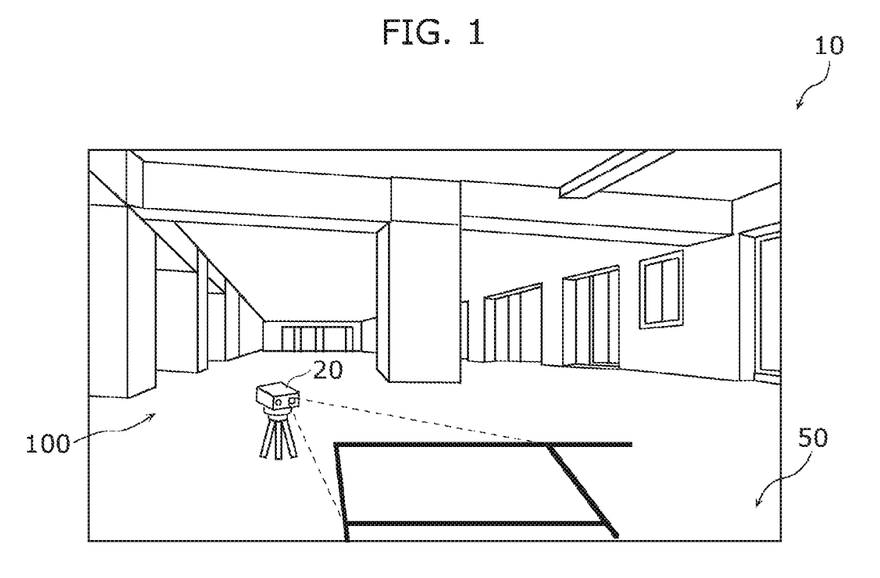
FIG. 1 is a diagram illustrating an overview of operation performed by a projection system according to an embodiment.

First, an overview of a projection system according to an embodiment will be described. FIG. 1 is a diagram illustrating an overview of operation performed by the projection system according to the embodiment.

Projection system 10 according to the embodiment includes projection device 20. Projection device 20 is provided in space 100 in a building under construction. Projection device 20 projects, in actual size, drawing data that is at least a part of architectural design data onto a structure (specifically, a floor, a wall, or a ceiling) creating space 100. The drawing data indicates a marking position in the space, for example. A line of light having a length as designed is projected onto a position where a user, such as a worker for construction work, is to draw a marking line.

With this, the user can readily draw a marking line by tracing the projected line of light. Note that it is not essential that a line of light is used as a guide to draw a marking line. A line of light itself may be used as a marking line.

Note that projection system 10 may be able to project a part of or the whole of architectural design data, and drawing data may be data other than data indicating a marking position. For example, if drawing data includes data indicating an installation position of equipment such as a built-in kitchen or a bathtub, projection system 10 may project the installation position of the equipment in actual size.

[Configuration]

Figure 2:
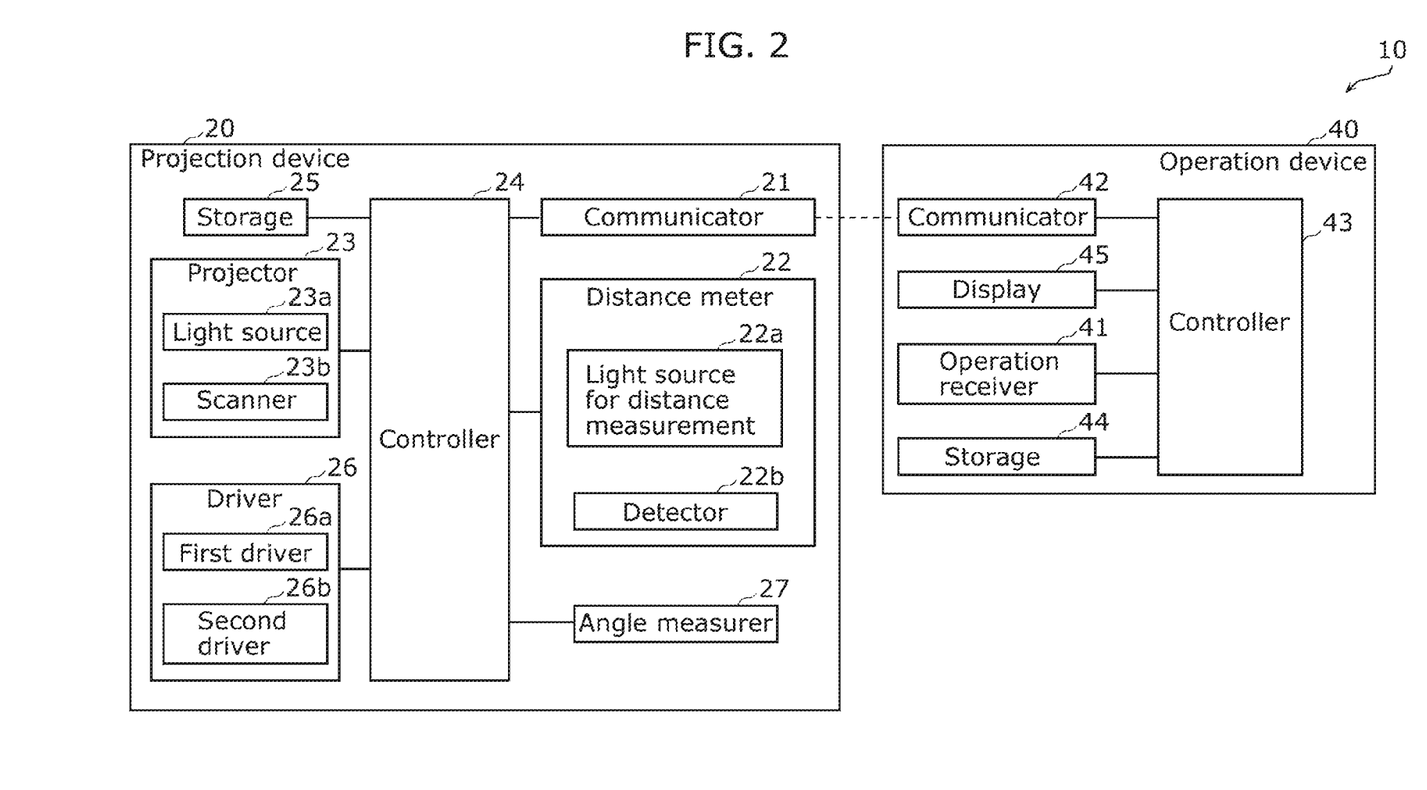
FIG. 2 is a block diagram illustrating a functional configuration of the projection system according to the embodiment.
Figure 3:
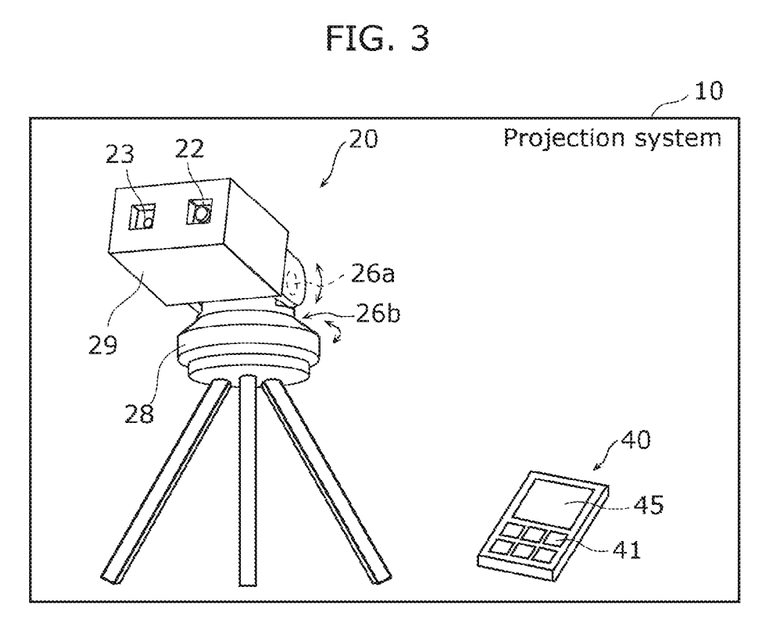
FIG. 3 is a diagram illustrating an appearance of devices constituting the projection system according to the embodiment.

Next, a configuration of the projection system according to the embodiment will be described. FIG. 2 is a block diagram illustrating a functional configuration of projection system 10. FIG. 3 is a diagram illustrating an appearance of devices constituting projection system 10. As illustrated in FIG. 2 and FIG. 3, projection system 10 includes projection device 20 and operation device 40. First, projection device 20 will be described.

Projection device 20 displays, in actual size, drawing data that is at least a part of architectural design data on a structure. Structures are, specifically, floors, walls, ceilings, and pillars. Projection device 20 is attached on a tripod and is provided on a floor, for example. Projection device 20 may be secured to a ceiling hanging bolt, or may be provided on a wall. Projection device 20 includes communicator 21, distance meter 22, projector 23, controller 24, storage 25, driver 26, angle measurer 27, attaching unit 28 (illustrated in FIG. 3), and casing 29 (illustrate in FIG. 3).

Communicator 21 is a communication circuit (in other words, a communication module) for projection device 20 to communicate with operation device 40. Communicator 21 performs wireless communication with operation device 40, but may perform wired communication with operation device 40. A communication standard for communication performed by communicator 21 is not particularly limited.

Distance meter 22 detects a distance from projection device 20 to a structure creating space 100. Distance meter 22 is a distance measurement sensor such as a time of flight (TOF) sensor. Distance meter 22 may be other distance measurement sensors, such as a distance measurement sensor using a phase difference detection method, or a distance measurement sensor using a triangular distance measurement method. Distance meter 22 includes light source for distance measurement 22a and detector 22b.

Light source for distance measurement 22a emits light toward a structure. Light source for distance measurement 22a is implemented by, for example, a light emitting element that emits infrared light, but may be implemented by a light emitting element that emits visible light. Note that, as will be described later, distance meter 22 has a laser pointer function for presenting the current distance measurement target point to a user. This function is implemented by a light source different from light source for distance measurement 22a, but in the case where light source for distance measurement 22a emits visible light, the function may be implemented by light source for distance measurement 22a.

Moreover, light source for distance measurement 22a is not necessarily a light source different from light source 23a included in projector 23. That is, light source 23a included in projector 23 may be used as light source for distance measurement 22a. More specifically, distance meter 22 may be a sensor that includes only detector 22b, without light source for distance measurement 22a.

Detector 22b is a light receiving element that detects reflected light which is light emitted by light source for distance measurement 22a and reflected off a structure. Detector 22b is implemented by, for example, a photodiode.

Projector 23 is a projection module for projecting drawing data onto projection plane 50. Projector 23 includes light source 23a, and scanner 23b. Note that, although not illustrated, projector 23 includes optical components such as a lens, a mirror, etc. other than the elements described above.

Light source 23a is a laser light source implemented by a semiconductor light emitting element, for example. Note that light source 23a may include light emitting elements having different luminescent colors (e.g., a red-light emitting element, a green-light emitting element, and a blue-light emitting element), and may have a configuration capable of switching between the luminescent colors.

Scanner 23b scans, on a structure, light emitted by light source 23a. Scanner 23b is implemented by, for example, a micro electro mechanical systems (MEMS) mirror.

Controller 24 is a control device that controls distance meter 22, projector 23, and driver 26 for projecting drawing data onto projection plane 50. Controller 24 is implemented by, for example, a microcomputer or a processor. Moreover, controller 24 may include a driving circuit for driving projector 23, and a driving circuit for driving driver 26.

Storage 25 is a storage device that stores drawing data, and a control program to be executed by controller 24. This control program is for projecting drawing data in actual size. Storage 25 is implemented by, for example, a semiconductor memory.

Driver 26 is a driving mechanism for changing an orientation of projection device 20 (in other words, an orientation and an angle of distance meter 22). To be more specific, driver 26 changes an orientation of casing 29 with respect to attaching unit 28. Driver 26 includes first driver 26a for changing an orientation of projection device 20 toward a tilt direction, and second driver 26b for changing an orientation of projection device 20 toward a pan direction. Each of first driver 26a and second driver 26b is implemented by a rotary driving device such as a motor. Note that driver 26 may include a third driver for changing an orientation of projection device 20 toward a roll direction. Moreover, driver 26 may be a mechanism having a ball-shaped joint.

Angle measurer 27 measures an orientation of projection device 20 (in other words, an orientation and an angle of distance meter 22). Specifically, angle measurer 27 is an angle sensor that measures a driving amount (i.e., a tilt angle and a pan angle) of driver 26. Note that when driver 26 includes a third driver for changing an orientation of projection device 20 toward a roll direction, angle measurer 27 may measure a roll angle as a driving amount of driver 26.

Attaching unit 28 is an attaching structure for attaching projection device 20 on a tripod. Note that projection device 20 may be attached to a ceiling hanging bolt. In this case, attaching unit 28 is an attaching structure for attaching projection device 20 on a ceiling.

Casing 29 accommodates communicator 21, distance meter 22, projector 23, controller 24, and storage 25. Casing 29 includes, for example, resin, but may include metal.

Next, operation device 40 will be described. Operation device 40 is a remote controller for a user to remotely control projection device 20. Operation device 40 is a remote controller exclusive to projection device 20, for example. A mobile terminal such as a smartphone or a tablet terminal in which an exclusive application program is installed may be used as operation device 40. Specifically, operation device 40 includes operation receiver 41, communicator 42, controller 43, storage 44, and display 45.

Operation receiver 41 is a user interface device that receives an operation performed by a user. Operation receiver 41 is implemented by, for example, a hardware button, but may be implemented by a touch panel.

Communicator 42 is a communication circuit (in other words, a communication module) for operation device 40 to communicate with projection device 20. Communicator 42 performs wireless communication with projection device 20, but may perform wired communication with projection device 20. A communication standard for communication performed by communicator 42 is not particularly limited.

Controller 43 causes communicator 42 to transmit, to projection device 20, an instruction signal for causing projection device 20 to operate according to an operation received by operation receiver 41. Controller 43 is implemented by, for example, a microcomputer or a processor.

Storage 44 is a storage device that stores a control program to be executed by controller 43. Storage 44 is implemented by, for example, a semiconductor memory. Storage 44 also stores architectural design data.

Architectural design data is three-dimensional data (more specifically, a three-dimensional CAD data) indicating the size and shape of space 100. Architectural design data also includes drawing data (two-dimensional data) indicating a floor plan of space 100, and drawing data indicating a marking position. Note that at least drawing data included in architectural design data is also stored in storage 25 of projection device 20.

Display 45 displays a screen showing, for example, operation conditions of projection device 20. Display 45 is implemented by, for example, a liquid crystal panel, or an organic electroluminescent (EL) panel.

Operation Example 1

Figure 4:
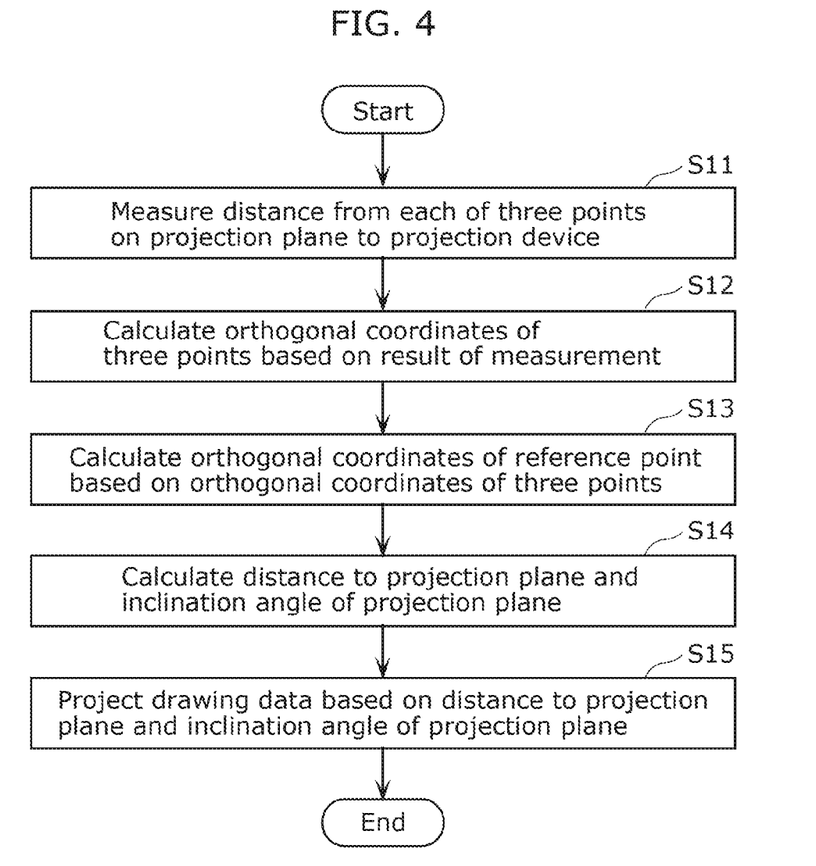
FIG. 4 is a flowchart illustrating operation example 1 of operation performed by the projection system according to the embodiment.

In order to accurately project drawing data, it is important to form an association between a position in the drawing data and a position in projection plane 50. Operation example 1 of operation performed by projection system 10 which includes a process of forming such an association will be described. FIG. 4 is a flowchart illustrating operation example 1 of operation performed by projection system 10.

Figure 5:
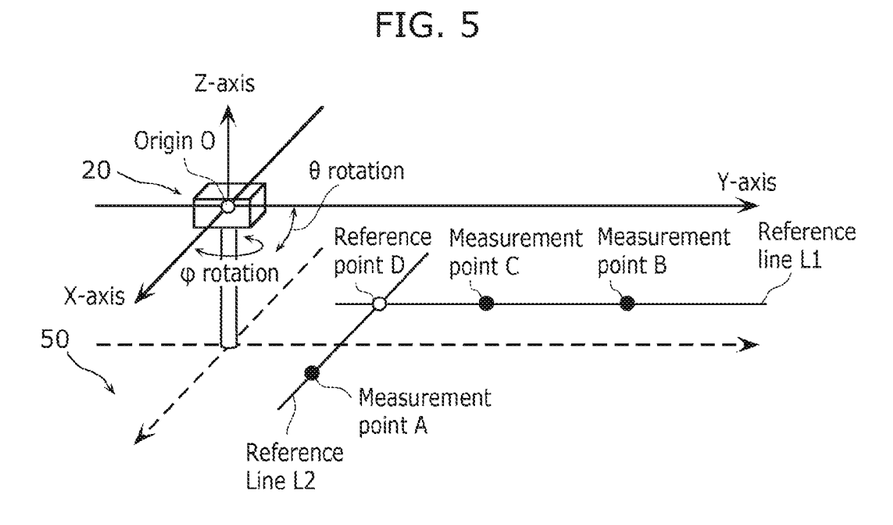
FIG. 5 is a diagram illustrating coordinate axes of orthogonal coordinates in a space.

Note that, in the following description of operation example 1, coordinate axes of orthogonal coordinates are set in space 100 as illustrated in FIG. 5. FIG. 5 is a diagram illustrating coordinate axes of orthogonal coordinates in space 100. The coordinate axes illustrated in FIG. 5 are determined by plotting, as origin O, the position of projection device 20 (more specifically, a predetermined position around distance meter 22 and projector 23 in projection device 20).

Moreover, in the following description of operation example 1, projection plane 50 is a floor surface, and two reference lines L1 and L2 are drawn on the floor surface. The two reference lines L1 and L2 are drawn by, for example, a user. The two references lines L1 and L2 are, for example, orthogonal to each other. The position of an intersection point of the two reference lines L1 and L2 is reference point D. Reference point D is a point onto which a predetermined point in drawing data is to be projected. Note that positions of reference lines L1 and L2 are specified in drawing data. Accordingly, reference lines L1 and L2 can be used for forming an association between a position in the drawing data and a position in projection plane 50. It is not essential that the two reference lines L1 and L2 are orthogonal to each other so long as the two reference lines L1 and L2 intersect with each other (so long as they are not parallel with each other).

First, a user provides projection device 20 in space 100, and measures a distance from each of three distance measurement target points (hereinafter, also referred to as measurement points) on projection plane 50 to projection device 20 (S11). Note that the user is to measure a distance from each of at least three distance measurement target points to projection device 20. The user may measure a distance from each of three or more distance measurement target points to projection device 20.

For example, distance meter 22 of projection device 20 uses a laser pointer to present a measurement point on projection plane 50 to the user. The user drives driver 26 to move the laser pointer over reference line L1 (or reference line L2), and performs, in the current state, a measurement instruction operation instructing measurement (storage) of the distance. Then, the distance from a measurement point to projection device 20 is stored in storage 25, together with the pan angle φ and the tilt angle θ at the time at which the measurement instruction operation is instructed. Note that the pan angle φ and the tilt angle θ are measured by angle measurer 27. By the user repeatedly performing such an operation for three times, distance r from each of three mutually different measurement points on projection plane 50 to projection device 20, and pan angles φ and tilt angles θ at the time at which the distances r are measured are stored in storage 25.

Next, controller 24 calculates orthogonal coordinates (xyz coordinates) of the three measurement points, based on the stored information (i.e., results of the distance measurement) (S12). Distance r from each of the three measurement points to projection device 20, and, pan angles φ and tilt angles θ at the time at which the distances r are measured, which are stored in storage 25, represent polar coordinates of the three measurement points. Controller 24 can convert these polar coordinates into orthogonal coordinates (xyz coordinates) based on the following Math. 1.

[Math. 1]

$$\begin{pmatrix} x \\ y \\ z \end{pmatrix} = \begin{pmatrix} r \cos\theta \sin\varphi \\ r \cos\theta \cos\varphi \\ r \sin\varphi \end{pmatrix} \quad \text{Math. 1}$$

Figure 6:
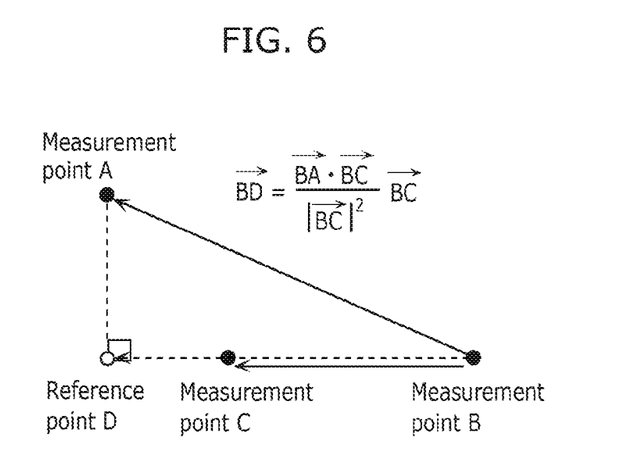
FIG. 6 is a diagram illustrating an equation for an orthogonal projection vector.

Next, controller 24 calculates orthogonal coordinates of reference point D, based on the orthogonal coordinates of the three measurement points (S13). As illustrated in FIG. 5, when the three measurement points are measurement point A, measurement point B, and measurement point C, controller 24 can calculate coordinates of reference point D based on an equation for an orthogonal projection vector shown in FIG. 6. FIG. 6 is a diagram illustrating an equation for an orthogonal projection vector. Note that, when one of measurement point A, measurement point B, and measurement point C is the same point as reference point D, a process of step S13 will be omitted.

Next, controller 24 calculates a distance from projection device 20 to projection plane 50 (i.e., a plane that passes through measurement point A, measurement point B, and measurement point C), and the inclination angle of projection plane 50 relative to projection device 20 (S14). The following Math. 2 (determinant) holds when an equation of projection plane 50 is ax+by +cz=d, where coordinates of measurement point A is $(x_a, y_a, z_a)$, coordinates of measurement point B is $(x_b, y_b, z_b)$, and coordinates of measurement point C is $(x_c, y_c, z_c)$. Controller 24 calculates normal vector n=(a, b, c) of projection plane 50 by modifying Math. 2 like Math. 3. Normal vector n indicates the inclination angle of projection plane 50 in the orthogonal coordinates, and the length of normal vector n indicates the distance from projection device 20 to projection plane 50. That is, the calculation of a normal vector is equivalent to the calculation of a distance from projection device 20 to projection plane 50 and the inclination angle of projection plane 50 relative to projection device 20.

[Math. 2]

$$\begin{pmatrix} x_a & y_a & z_a \\ x_b & y_b & z_b \\ x_c & y_c & z_c \end{pmatrix} \begin{pmatrix} a \\ b \\ c \end{pmatrix} = \begin{pmatrix} d \\ d \\ d \end{pmatrix} \quad \text{Math. 2}$$

$$\begin{pmatrix} a \\ b \\ c \end{pmatrix} = \begin{pmatrix} x_a & y_a & z_a \\ x_b & y_b & z_b \\ x_c & y_c & z_c \end{pmatrix}^{-1} \begin{pmatrix} d \\ d \\ d \end{pmatrix} \quad \text{Math. 3}$$

Next, controller 24 causes projector 23 to project drawing data onto projection plane 50, based on the calculated distance from projection device 20 to projection plane 50 and the calculated inclination angle of projection plane 50 (S15). Specifically, controller 24 corrects distortion of the drawing data according to the calculated inclination angle of projection plane 50, and corrects a projection scaling factor for the drawing data, based on the calculated distance to projection plane 50.

In addition, the drawing data includes position information of the reference lines. Then, controller 24 causes projector 23 to project the corrected drawing data onto projection plane 50 such that reference lines L1 and L2 in the corrected drawing data overlap reference lines L1 and L2 of the projection plane, and that a predetermined point of the corrected drawing data overlaps the calculated coordinates of reference point D (i.e., determination of projection position). With this, the drawing data is projected onto projection plane 50 in actual size.

As has been described, projection system 10 uses points on reference lines L1 and L2 of a projection plane which are specified in drawing data as measurement points (points whose coordinates are identified). Therefore, projection system 10 can readily form an association between a position in drawing data and a position in projection plane 50.

[Variation 1]

Figure 7:
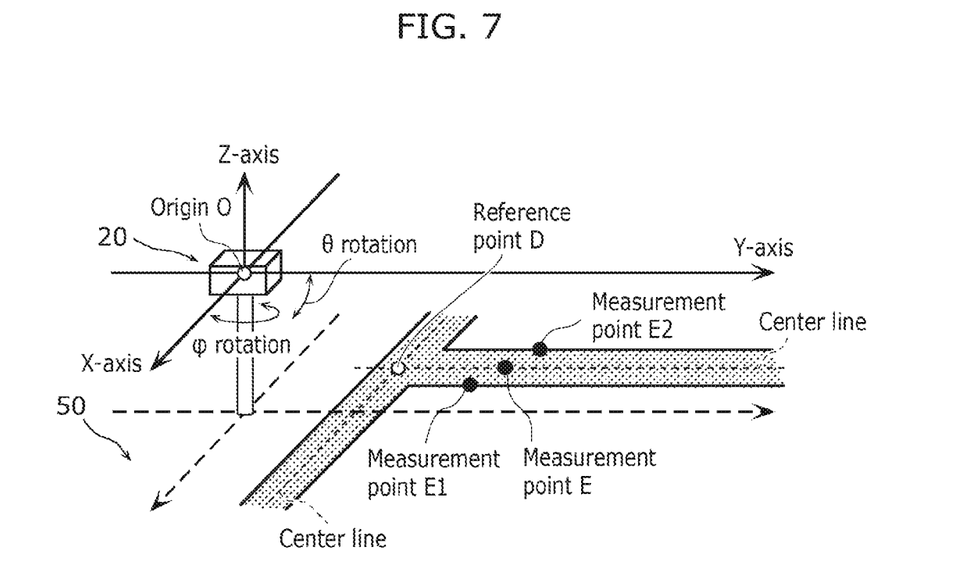
FIG. 7 is a diagram illustrating a space in which reference lines are not drawn on a projection plane.

In the above-described operation example 1, the two straight lines are the two reference lines L1 and L2 orthogonal to each other which are drawn on projection plane 50 in advance as marks. However, a case in which reference lines L1 and L2 are not drawn can be assumed. FIG. 7 is a diagram illustrating space 100 in which reference lines L1 and L2 are not drawn on projection plane 50.

In the example shown in FIG. 7, two beams are disposed on projection plane 50 such that the two beams intersect with each other, for example. Reference point D is an intersection point of center lines indicating the center positions of the beams. These center lines are imaginary lines not drawn on projection plane 50, but the positions of the center lines are specified in drawing data.

When reference lines L1 and L2 are not drawn on projection plane 50 as described above, projection device 20 may indirectly measure a distance to measurement point E on a center line.

For example, distance meter 22 of projection device 20 uses a laser pointer to present a measurement target point on projection plane 50 to a user. The user drives driver 26 to move the laser pointer over an edge (e.g., measurement point E1) of a beam, and performs, in the current state, a measurement instruction operation instructing measurement (storage) of the distance. Then, the distance from measurement point E1 to projection device 20 is stored in storage 25, together with the pan angle $\varphi$ and the tilt angle $\theta$ at the time at which the measurement instruction operation is instructed.

Similarly, the user drives driver 26 to move the laser pointer over the other edge (e.g., measurement point E2) of the beam, and performs, in the current state, a measurement instruction operation instructing measurement (storage) of the distance. Then, the distance from measurement point E2 to projection device 20 is stored in storage 25, together with the pan angle $\varphi$ and the tilt angle $\theta$ at the time at which the measurement instruction operation is instructed.

Thereafter, controller 24 (or distance meter 22) calculates polar coordinates of the midpoint between polar coordinates of measurement point E1 and polar coordinates of measurement point E2 as polar coordinates of measurement point E.

As has been described above, a distance from measurement point E on the center line to projection device 20 may be indirectly measured by distance meter 22 measuring a distance from each of measurement point E1 on an edge of a beam and measurement point E2 on the other edge of the beam to projection device 20, and controller 24 calculating the distance to the point on the center line based on the measured distances. Note that a beam is an example of a structure. A distance from a point on the center line of other structures excepting a beam to projection device 20 may be indirectly measured.

Since projection system 10 as has been described above uses a point on a center line whose position is specified in drawing data as a measurement point (a point whose coordinates are identified), projection system 10 can readily form an association between a position in drawing data and a position in projection plane 50.

[Variation 2]

Figure 8:
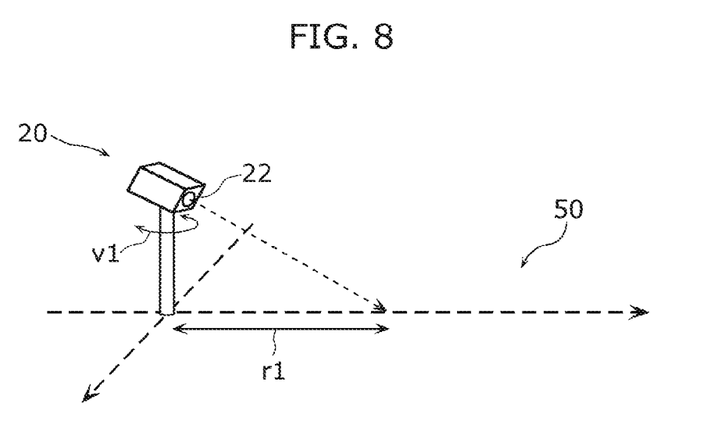
FIG. 8 is a first diagram illustrated for describing a change in a driving speed of a driver.
Figure 9:
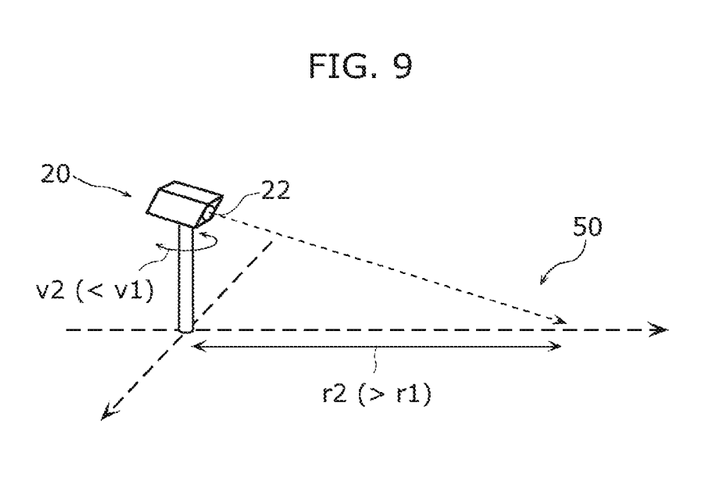
FIG. 9 is a second diagram illustrated for describing a change in a driving speed of the driver.

When moving the laser pointer of distance meter 22 over a point on reference lines L1 and L2 (in other words, when a user selects a distance measurement target point), an orientation of distance meter 22 is changed by driver 26. In this case, distance meter 22 may continuously measure a distance to a distance measurement target point, and controller 24 may change a rotation driving speed of driver 26 according to the distance measured by distance meter 22. That is, a speed at which an orientation of projection device 20 is changed by driver 26 may vary depending on a distance from a selected distance measurement target point to projection device 20. FIGS. 8 and 9 are diagrams for describing a change in a driving speed of driver 26.

As illustrated in FIG. 8, when the distance measured by distance meter 22 is distance r1, the driving speed of driver 26 is v1. In contrast, when the distance measured by distance meter 22 is distance r2 that is longer than distance r1 as illustrated in FIG. 9, the driving speed of driver 26 is v2 that is slower than v1. As described, controller 24 drives driver 26 at a slower speed for a longer distance, which is measured by distance meter 22. In other words, controller 24 reduces the speed at which an orientation of distance meter 22 is changed as the distance measured by distance meter 22 increases. Note that although the driving speed at which second driver 26b is driven in a pan direction is denoted by an arrow as an example in FIG. 8, the driving speed at which first driver 26a is driven in a tilt direction is also changed in the same manner.

With this, since a measurement position is hardly changed when a distance measured by distance meter 22 is long, an operation for a user to move a laser pointer is facilitated.

[Variation 3]

Since space 100 in a huge building is large, a user needs to repeatedly perform operation of changing the position of projection device 20 and projecting a drawing data in space 100. When a number of places having similar structure are present in space 100, it may be difficult to form an association between a position in a drawing data and a position in projection plane 50 only by performing operation described in operation example 1. For example, there may be a case where massive calculations need to be performed in order to form accurate associations.

Figure 10:
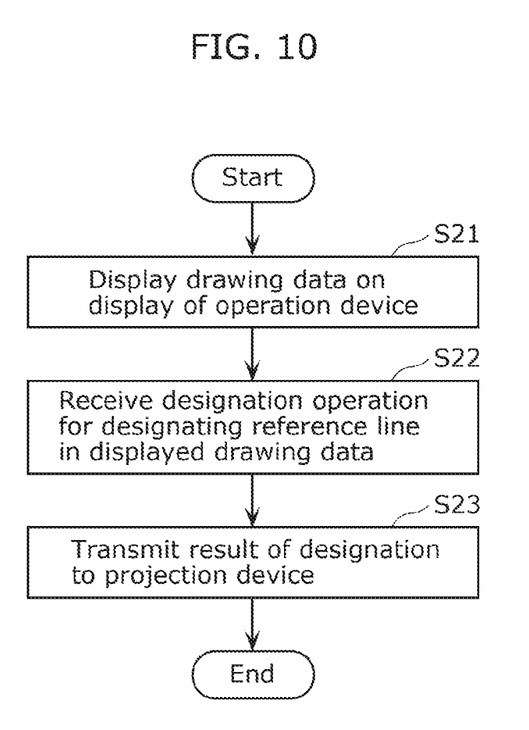
FIG. 10 is a flowchart illustrating operation for receiving designation operation for designating reference lines.

In such case, operation locations (e.g., positions of measurement target reference lines L1 and L2) may be designated by a user for projection device 20 by inputting operation locations into operation device 40. FIG. 10 is a flowchart illustrating operation for receiving designation operation for designating reference lines.

As illustrated in FIG. 10, display 45 of operation device 40 displays drawing data (S21), and operation receiver 41 receives designation operation for designating reference lines in the displayed drawing data (S22). Controller 43 causes communicator 42 to transmit a result of the designation to projection device 20 (S23). Once the user designates which parts of the displayed drawing data correspond to measurement target reference lines L1 and L2, projection device 20 can readily form associations between positions in the drawing data and positions in projection plane 50 by projection device 20 recognizing the reference lines in the drawing data.

[Variation 4]

Figure 11:
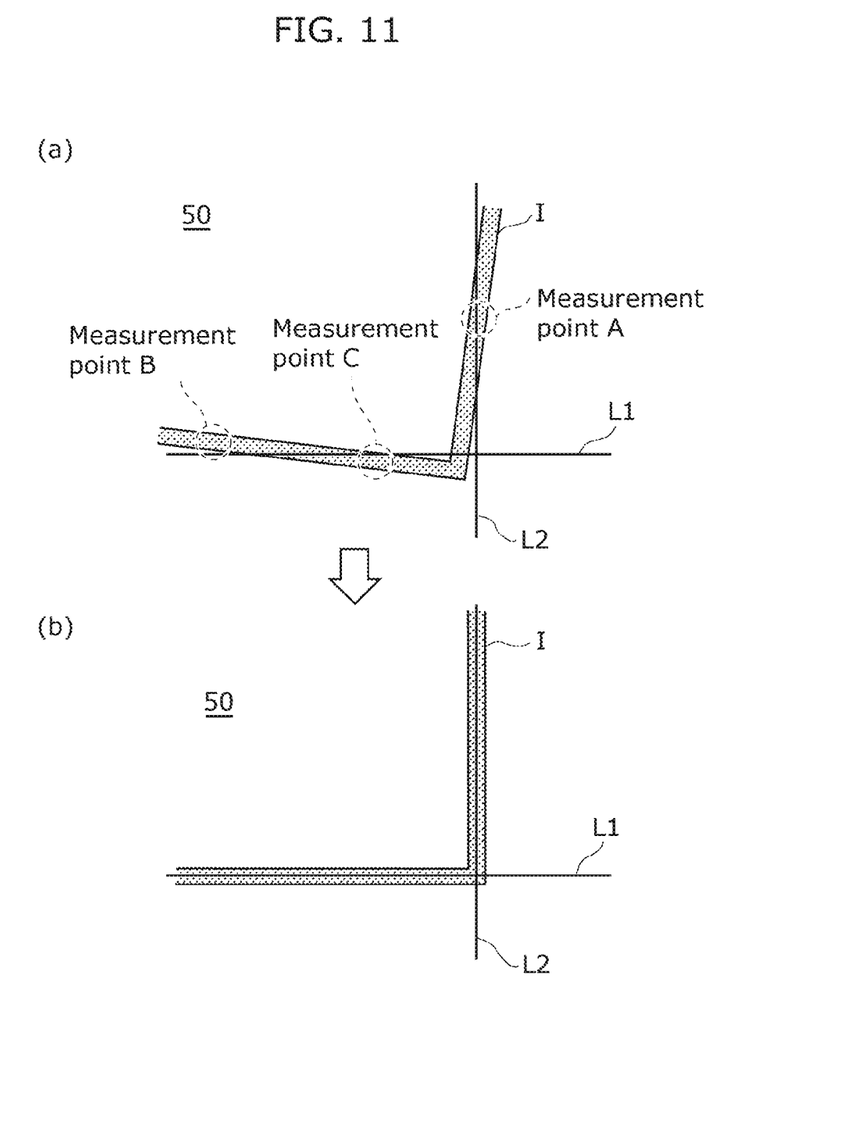
FIG. 11 is a diagram illustrating an example of a confirmation image.

As has been described above, three measurement points are selected by a user using, for example, the laser pointer function of distance meter 22. For this reason, these points may be misaligned with reference lines drawn on projection plane 50. Thus, after the user selecting three measurement points, a confirmation image showing the positions of the selected three measurement points may be projected. FIG. 11 is a diagram illustrating an example of such confirmation image. FIG. 11 illustrates a diagram showing reference lines L1 and L2 drawn on projection plane 50 and a confirmation image which are viewed from a direction perpendicular to projection plane 50.

As illustrated in FIG. 11, confirmation image I is an L-shaped line determined by three measurement points (an L-shaped line that passes through the three measurement points), and is projected by projector 23. That is, the confirmation image is an image of two intersecting line segments. Note that confirmation image I is to be an image showing positions of three measurement points. For example, confirmation image I may show three dots that directly indicate the positions of the three measurement points. Confirmation image I may be any image so long as it shows positions of three measurement points.

As illustrated in (a) of FIG. 11, a user can readily recognize the misalignment between the three measurement points and reference lines L1 and L2 according to confirmation image I.

Here, when the three measurement points and reference lines L1 and L2 are misaligned as illustrated in (a) of FIG. 11, distances to the three measurement points may be remeasured once again (in other words, the three measurement points may be reselected). Alternatively, controller 24 may adjust the projection position of confirmation image I such that positions of the two line segments shown by confirmation image I are projected over the two reference lines, and may correct the projection position of drawing data according to a result of the adjustment.

For example, controller 24 finely adjusts the projection position of confirmation image I each time operation receiver 41 of operation device 40 receives an adjustment operation from a user. When a confirmation image overlaps reference lines L1 and L2 as illustrated in (b) of FIG. 11 as a result of repeated fine adjustments, operation receiver 41 receives an adjustment completion operation from the user. Controller 24 stores an amount of adjustment which is added up from the start of the adjustment to the end of the adjustment in storage 25, and cause projector 23 to project drawing data with consideration given to the amount of adjustment. With this, a user can project drawing data onto projection plane 50, without remeasuring distances to three measurement points.

Advantageous Effects, Etc

As has been described above, a projection method, which is executed by projection device 20, for projecting drawing data for a building onto a projection plane of the building under construction includes: measuring a distance from each of three or more points which are not aligned in a straight line and are on either of two non-parallel straight lines on projection plane 50 to projection device 20 using distance meter 22 included in projection device 20 (S11); measuring an angle (e.g., a pan angle and a tilt angle) of distance meter 22 at a time at which the distance is measured; and projecting the drawing data onto a projection position on projection plane 50 which is determined based on the distance measured and the angle of distance meter 22 at the time at which the distance is measured (S15).

Such a projection method as described above can readily form an association between a position in drawing data and a position in projection plane 50 by using points on reference lines L1 and L2 of the projection plane as measurement points (points whose coordinates are identified), when the positions of two lines in the drawing data are specified.

In addition, the projection position is determined such that an intersection point of the two straight lines overlaps a predetermined point of the drawing data.

Such a projection method as described above can readily form an association between a position in a drawing data and a position in projection plane 50 by using the position of an intersection point of two straight lines.

In addition, the projection method further includes calculating a distance from projection device 20 to projection plane 50 and an inclination angle of projection plane 50, based on the measured distance and the measured angle of distance meter 22 at the time at which the distance is measured (S14). In the projecting (S15), the drawing data on which distortion correction is performed based on the calculated inclination angle of projection plane 50 is projected onto the projection position using a projection scaling factor determined based on the calculated distance from projection device 20 to projection plane 50.

Such a projection method as described above can project drawing data in actual size.

In addition, the two straight lines are two straight lines orthogonal to each other which are drawn on projection plane 50 in advance.

In such a projection method as described above, a user can set measurement points on two straight lines, since the user can visually check the two straight lines.

In addition, in Variation 1, at least one of the two straight lines is a center line indicating a center position of a structure and is an imaginary center line not drawn on projection plane 50, and at least one of the three or more points is positioned on the center line. In the measuring the distance (S11), a distance from each of a point on an edge of the structure and a point on the other edge of the structure to projection device 20 is measured, and by calculating a distance to a point on the center line based on the measured distance, a distance from the at least one of the three or more points to projection device 20 is indirectly measured.

In such a projection method as described above, a user can set measurement points on two straight lines, even when the user cannot visually check the two straight lines.

In addition, in Variation 2, the projection method further includes driving driver 26 included in projection device 20 to change an angle of distance meter 22 for selecting any of the three or more points as a distance measurement target point (FIG. 8 and FIG. 9). The speed at which the angle of distance meter 22 is changed by driver 26 varies depending on a distance from the selected distance measurement target point to projection device 20.

According to such a projection method as described above, an operation for a user to set a distance measurement target point is facilitated since a measurement position is hardly changed by reducing the speed at which an angle of distance meter 22 is changed as the distance measured by distance meter 22 increases.

In addition, in Variation 3, the projection method further includes: displaying the drawing data on display 45 (S21); and receiving an operation of a user for designating which parts of the displayed drawing data correspond to the two straight lines (S22).

Such a projection method as described above can readily form an association between a position in a drawing data and a position in projection plane 50 by projection device 20 recognizing positions of two lines in drawing data which are designated by a user.

In addition, in Variation 4, the projection method further includes projecting confirmation image I indicating positions of the two straight lines ((a) of FIG. 11).

According to such a projection method as described above, a user can readily check the positions of two straight lines.

In addition, in Variation 4, confirmation image I is an image of two intersecting line segments.

According to such a projection method as described above, a user can readily check the positions of two straight lines.

In addition, in Variation 4, two reference lines are drawn on projection plane 50 in advance, and the projection method further includes adjusting a projection position of confirmation image I such that the positions of the two straight lines shown by confirmation image I are over the two reference lines ((b) of FIG. 11).

Such a projection method as described above can correct the projection position of drawing data according to a result of adjustment.

In addition, projection device 20 includes: projector 23 that projects drawing data for a building onto a projection plane of the building under construction; distance meter 22 that measures a distance from each of three or more points which are not aligned in a straight line and are on either of two non-parallel straight lines on projection plane 50 to projection device 20; angle measurer 27 that measures an angle of distance meter 22 at a time at which the distance is measured; and controller 24 that causes projector 23 to project the drawing data onto a projection position on projection plane 50 which is determined based on the measured distance and the angle of distance meter 22 at the time at which the distance is measured.

Projection device 20 as described above can readily form an association between a position in drawing data and a position in projection plane 50 by using points on reference lines L1 and L2 of the projection plane as measurement points (points whose coordinates are identified), when the positions of two lines in the drawing data are specified.

In addition, projection system 10 includes: projection device 20; and operation device 40 for a user to remotely control projection device 20.

Projection system 10 as described above can readily form an association between a position in drawing data and a position in projection plane 50 by using points on reference lines L1 and L2 of the projection plane as measurement points (points whose coordinates are identified), when the positions of two lines in the drawing data are specified.

Other Embodiments

The foregoing has described embodiments, yet the present invention is not limited to the above-described embodiments.

For example, although a laser scanning type projection device has been described in the above-described embodiments, the present invention may be implemented by a projector of another type. The projection device is to project at least a part of architectural design data onto a projection plane in actual size.

In addition, the projection system includes a projection device and an operation device in the above-described embodiments. However, the projection system may be implemented as a single device. Moreover, the projection system may be implemented as a client-server system. In this case, a server device performs a part of processing described as performed by the projection device in the above-described embodiments.

In addition, the orders of processes described in the flowcharts of the above-described embodiments are mere examples. The order of processes may be changed, and the processes may be performed in parallel.

In addition, the communication method employed between devices in the above-described embodiments is not particularly limited. Wireless communication or wired communication may be performed between the devices. Moreover, a combination of wireless communication and wired communication may be performed between the devices. In addition, when two devices perform communication in the above-described embodiments, a relay device that is not illustrated may be interposed between the two devices.

Moreover, in the above-described embodiments, each of elements may be implemented by executing a software program suitable for the element. Each element may be implemented by a program execution unit, such as a central processing unit (CPU), processor or the like, loading and executing a software program stored in a storage medium such as a hard disk or a semiconductor memory.

Moreover, each element may be implemented by a hardware product. For example, each element may be a circuit (or an integrated circuit). These circuits may constitute a single circuit as a whole or may be individual circuits. Moreover, these circuits may be general-purpose circuits, or dedicated circuits.

Note that general or specific aspects of the present invention may be implemented by a system, a device, a method, an integrated circuit, a computer program, or a computer-readable recording medium such as a CD-ROM. The general or specific aspects of the present invention may also be implemented by an optional combination of a system, a device, a method, an integrated circuit, a computer program, and a recording medium.

For example, the present invention may be implemented as a program for causing a computer to execute the projection method. Alternatively, the present invention may be implemented as a non-transitory computer-readable recording medium on which such a program is recorded.

The present invention also encompasses: embodiments achieved by applying various modifications conceivable to those skilled in the art to each embodiment; and embodiments achieved by optionally combining the structural elements and the functions of each embodiment without departing from the essence of the present invention.

REFERENCE SIGNS LIST 10 projection system
20 projection device
22 distance meter
23 projector
26 driver
27 angle measurer
40 operation device
45 display
50 projection plane

The invention claimed is:

1. A projection method, which is executed by a projection device, for projecting drawing data included in CAD data for a building onto a projection plane of the building under construction, the projection method comprising:
measuring a distance from each of three or more points on either of two straight lines on the projection plane to the projection device using a distance meter included in the projection device, the two straight lines being non-parallel lines, the three or more points being not aligned in a straight line;
measuring an angle of the distance meter at a time at which the distance is measured; and
projecting, in design dimensions predetermined in the CAD data, the drawing data onto a projection position on the projection plane, the projection position being determined based on the distance measured and the angle of the distance meter at the time at which the distance is measured.

2. The projection method according to claim 1, wherein the projection position is determined such that an intersection point of the two straight lines overlaps a predetermined point of the drawing data.

3. The projection method according to claim 1, further comprising:
calculating a distance from the projection device to the projection plane and an inclination angle of the projection plane, based on the distance measured and the angle measured, wherein
in the projecting, the drawing data on which distortion correction is performed based on the inclination angle calculated is projected onto the projection position using a projection scaling factor determined based on the distance calculated.

4. The projection method according to claim 1, wherein the two straight lines are two straight lines orthogonal to each other which are drawn on the projection plane in advance.

5. The projection method according to claim 1, wherein
at least one of the two straight lines is a center line indicating a center position of a structure, and is an imaginary center line not drawn on the projection plane,
at least one of the three or more points is positioned on the center line, and
in the measuring the distance, a distance from each of a point on an edge of the structure and a point on an other edge of the structure to the projection device is measured, and by calculating a distance to a point on the center line based on the distance measured, a distance from the at least one of the three or more points to the projection device is indirectly measured.

6. The projection method according to claim 1, further comprising:
driving a driver included in the projection device to change an angle of the distance meter for selecting any of the three or more points as a distance measurement target point, wherein
a speed at which the angle of the distance meter is changed by the driver varies depending on a distance from the distance measurement target point selected to the projection device.

7. The projection method according to claim 1, further comprising:
displaying the drawing data on a display; and
receiving an operation of a user for designating which parts of the drawing data displayed correspond to the two straight lines.

8. The projection method according to claim 1, further comprising:
projecting a confirmation image indicating positions of the two straight lines.

9. The projection method according to claim 8, wherein the confirmation image is an image of two intersecting line segments.

10. The projection method according to claim 8, wherein two reference lines are drawn on the projection plane in advance, and the projection method further comprises:
  adjusting a projection position of the confirmation image such that the positions of the two straight lines shown by the confirmation image are over the two reference lines.

11. A projection device comprising:

a projector that projects drawing data included in CAD data for a building onto a projection plane of the building under construction;

a distance meter that measures a distance from each of three or more points on either of two straight lines on the projection plane to the projection device, the two straight lines being non-parallel lines, the three or more points being not aligned in a straight line;

an angle measurer that measures an angle of the distance meter at a time at which the distance is measured; and a controller that causes the projector to project, in design dimensions predetermined in the CAD data, the drawing data onto a projection position on the projection plane, the projection position being determined based on the distance measured and the angle of the distance meter at the time at which the distance is measured.

12. A projection system comprising:

a projection device according to claim 11; and an operation device for a user to remotely control the projection device.

13. The projection method according to claim 1, wherein the two straight lines are drawn on the projection plane in advance, positions of two reference lines corresponding to the two straight lines are specified in the drawing data, and the projecting includes projecting the drawing data such that the two reference lines included in the drawing data overlap the two straight lines on the projection plane.

14. The projection device according to claim 11, wherein the two straight lines are drawn on the projection plane in advance, positions of two reference lines corresponding to the two straight lines are specified in the drawing data, and the controller causes the projector to project the drawing data such that the two reference lines included in the drawing data overlap the two straight lines on the projection plane.

15. A projection method, which is executed by a projection device, for projecting drawing data included in CAD data for a building onto a projection plane of the building under construction, the projection method comprising:

measuring a distance from each of three or more points on either of two straight lines on the projection plane to the projection device using a distance meter included in the projection device, the two straight lines being non-parallel lines, the three or more points being not aligned in a straight line;

measuring an angle of the distance meter at a time at which the distance is measured; and projecting, in actual size, the drawing data onto a projection position on the projection plane, the projection position being determined based on the distance measured and the angle of the distance meter at the time at which the distance is measured, wherein at least one of the two straight lines is a center line indicating a center position of a structure, and is an imaginary center line not drawn on the projection plane, at least one of the three or more points is positioned on the center line, and in the measuring the distance, a distance from each of a point on an edge of the structure and a point on an other edge of the structure to the projection device is measured, and by calculating a distance to a point on the center line based on the distance measured, a distance from the at least one of the three or more points to the projection device is indirectly measured.

* * * * *